Nov. 9, 1971   F. G. NAULT   3,618,434
MACHINE ALIGNMENT BAR
Filed Nov. 17, 1969
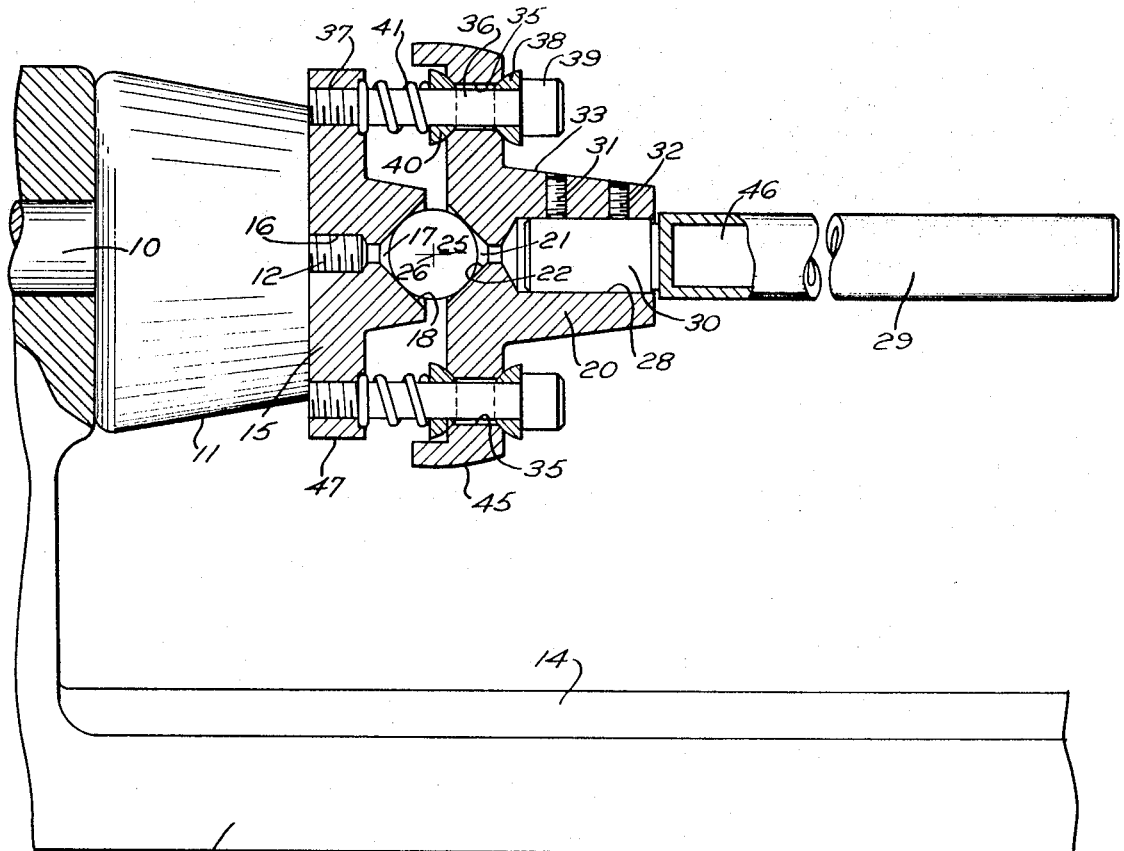
FIG. 1
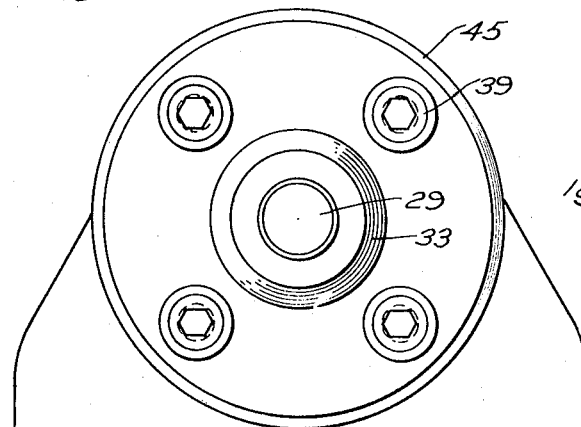
FIG. 3
FIG. 2
INVENTOR
FRANCIS GERARD NAULT
BY
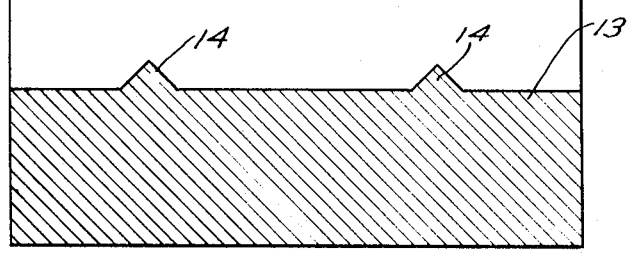
ATTORNEYS United States Patent Office 3,618,434
Patented Nov. 9, 1971

3,618,434
MACHINE ALIGNMENT BAR
Francis Gerard Nault, Warwick, R.I., assignor to Gentool Inc.
Filed Nov. 17, 1969, Ser. No. 877,211
Int. Cl. B23b 25/06
U.S. Cl. 82—45       5 Claims

ABSTRACT OF THE DISCLOSURE

An assembly for aligning the guiding surfaces of a machine with a rotatable member for alignment in two right-angular planes with respect to the axis of the rotatable member by means of a bar holder which is universally mounted with respect to a base about a center between the holder and the base and with an arcuate surface on the bar holder whose center of radius is the center of point of swing between the holder and the base.

BACKGROUND OF THE INVENTION

This assembly is to be utilized with any machine in which there is a rotatable member and some guiding surface such as a bed in generally a parallel relation to the axis of the rotatable member, it being desired to have this guiding surface along a straight line parallel to the axis of the member in two planes at right angles to each other.

This tool may be used by machine builders, rebuilders, as well as inspectors to insure the accuracies of alignments mentioned above.

There is always more work done adjacent the end of the spindle of a lathe which drives the workpiece than there is some distance away from the end of the spindle and consequently the guiding surfaces of the ways have more wear at this location and when it is necessary to machine some part of considerable length accurately, the guiding surfaces such as the ways of a lathe which guide the tool carriage must be dressed in order to obtain the parallelism desired.

Bars which have been utilized for this purpose heretofore have a general construction such as shown in Patent 2,411,621 dated Nov. 26, 1946. In such a construction for the alignment of the bar in a rotatable spindle it is necessary to align with a gauge the base and at the end of the bar which is swung about the center of the ball and then to return and align the bar or bar holder if they happen to be in separate pieces again with the gauge adjacent the axis of the ball, because the surface of the bar or bar holder is such that it does not swing concentrically about the axis of the ball.

SUMMARY OF THE INVENTION

This assembly comprises a base and a bar holder which is assembled therewith about a ball with the bar holder having a circular periphery machined on an arcuate surface whose center is the axis of the ball with adjustments enabling the swinging of the bar or bar holder relative to the base about the axis of the ball and with the outer surface of the bar holder always swinging concentric with the axis of the ball. By reason of this arrangement the use of the gauge may initially take place along the arcuate surface of the bar holder with a second gauging taking place at the end of the bar while a third gauging will be unnecessary, the first gauging taking the place of the third gauging heretofore required.

BRIEF DESCRIPTION OF THE DRAWINGS

FIG. 1 is a sectional view of the machine alignment bar partly in elevation illustrating somewhat diagrammatically the lathe spindle and the bed of the lathe to show the general relationship of the parts;

FIG. 2 is an end view of the showing of FIG. 1 with the lathe bed in section; and FIG. 3 is an enlarged fragmental sectional view showing the concave bearing surfaces for the spherical member.

DESCRIPTION OF THE PREFERRED EMBODIMENT

With reference to the drawings I have illustrated for convenience the machine alignment bar of this invention in its relation to a lathe in which there is shown a hollow lathe spindle 10 having a tapered nose 11 with a threaded draw bolt 12 projecting from the end thereof. The lathe bed is designated generally 13 with ways 14 in spaced relation on either side of the axis of rotation of the spindle. It is desired that the surfaces of these ways maintain a horizontal parallel alignment with the axis of the spindle and also that the rotational axis of the spindle will be perpendicular to a vertical plane which is perpendicular to the guiding surfaces of the ways.

The aligning assemblage comprising a base 15 having a threaded recess 16 to be screwed onto a draw bolt and pulled against the spindle nose 11 in a known manner is also provided with a V recess 17 whose surfaces 18 provide a generally conical recess with these surfaces 18 at substantially 45° to the axis of rotation of the spindle.

A bar holder 20 is provided with a recess 21 having surfaces 22 providing a generally conical recess with these surfaces also inclined substantially 45° to the intended axis of rotation of the work holder when assembled with the base.

These recesses 17 and 21 receive a sphere 25 between them which provides for universal motion of the bar holder 20 with reference to the base 15 about the center axis 26 of the sphere or ball 25. The sphere 25 is provided with a hardened surface and the V surfaces 18 and 22 are initially softer than the surface of the sphere 25 and pressure is applied so as to indent these surfaces 18 and 22 to form concave areas 19 and 23 (FIG. 3) to receive the sphere and increase the bearing surface for the sphere, thus increasing its wearing life. The bar holder is provided with a recess 28 for receiving a bar designated generally 29 and which may be reduced slightly at one end as at 30 for reception in this recess. This recess is concentric with the axis of the holder 20 and the bar is held in position by set screws 31 and 32 which extend radially from the recess 28 to the outer peripheral tapered surface 33 of the bar holder 20. The bar holder is provided with a plurality (here four) of holes 35 extending through the generally dish-shaped holder at points spaced radially from the center of the holder and of a size to loosely receive screws 36 which pass through these openings 35 and have threaded engagement as at 37 with the base 15. A hemispherical washer 38 engages beneath the head 39 of the screw and partially enters the opening 35 along its spherical surface while its flat surface engages the head 39. Another hemispherical washer 40 has its curved surface partially entering the opening 35 in opposed relation to the washer 38, while its flat surface is engaged by spring 41 urging the washer into the opening 35 and drawing both washers into the opening 35 by reason of the action of the head 39 opposing the force of the spring. The screw 39 has an Allen head or recess which may be engaged to rotate the screw further into the base or in the other direction releasing it from the movement toward the base so as to provide an adjustment of the bar 29 with relation to the base. There are four of these screws 39 equally oriented about the axis of the assembly so that by tightening one or loosening another or both the bar may be rocked about the center 26 of the ball 25.

In order that the outer arcuate surface 45 will maintain a true relation during this swinging of the bar, this outer arcuate surface 45 is swung about a radius from the center 26 of the ball 25. Thus, regardless of the movement of the bar to align it in one direction or the other, this surface will always remain the same affording an opportunity for a gauge to be positioned against this surface for the alignment of the spindle with relation to the ways 14 of the bed of the lathe.

The bar 29 is machined cylindrical accurately and is provided with a recess 46 extending from a point adjacent its support in its holder 20 to its distant end so that the weight of the bar will minimize sagging of the bar which is unsupported from the holder only while in use.

In use the base will be mounted on the spindle by means of the draw bolt 12 just touching the end of the spindle and not drawn up tightly and a gauge which is mounted on the lathe bed 13 will be positioned against the surface 45 and the ways 14 and the bar will be aligned at this point by tapping the surface of the base along its periphery 47 in a customary manner and when this surface 45 is found to be concentric with the axis of the spindle the draw bolt will be tightened. Then the gauge will be moved to the end of the bar 29 and the bar will then be aligned by means of the screws 39 until it is found that this is concentric. The alignment is then complete. It will be unnecessary to go back and again align the bar along the surface 45 as this was already initially done. Thus one alignment is eliminated from what is the usual practice of three alignments in the positioning of a bar for the further reference in re-surfacing the bed along intermediate points.

I claim:

1. An assembly for aligning the guiding surfaces of a carriage slidable thereover with a rotatable spindle comprising a base, a bar holder, means to assemble said base and holder for relative universal movement about a center between them, said bar holder having a skirt-like peripheral edge with a part spherical surface on a radius from said center.

2. An assembly as in claim 1 wherein said means comprises a sphere.

3. An assembly as in claim 1 wherein said bar holder comprises a socket and a removable bar therein cylindrical in cross section.

4. An assembly as in claim 1 wherein said holder held against a ball between the base and holder by screws with springs urging the holder away from said base.

5. An assembly as in claim 2 wherein said sphere is received in a concave bearing surface.

References Cited

UNITED STATES PATENTS 2,411,621   11/1946   Nault _____ 82—45

FOREIGN PATENTS 549,816   12/1942   Great Britain _____ 33—169 C

LEONIDAS VLACHOS, Primary Examiner

U.S. Cl. X.R.

33—169 C